United States Patent
He et al.

(10) Patent No.: US 11,395,197 B2
(45) Date of Patent: Jul. 19, 2022

(54) DUAL CONNECTIVITY HANDOVER

(71) Applicant: Nokia Technologies OY, Espoo (FI)

(72) Inventors: Jing He, Beijing (CN); Tero Henttonen, Espoo (FI); Amaanat Ali, Espoo (FI); Jedrzej Stanczak, Poznan (PL)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 17/263,238

(22) PCT Filed: Aug. 21, 2018

(86) PCT No.: PCT/CN2018/101584
§ 371 (c)(1),
(2) Date: Jan. 26, 2021

(87) PCT Pub. No.: WO2020/037503
PCT Pub. Date: Feb. 27, 2020

(65) Prior Publication Data
US 2021/0168674 A1 Jun. 3, 2021

(51) Int. Cl.
*H04W 36/00* (2009.01)
*H04W 36/08* (2009.01)
*H04W 74/08* (2009.01)

(52) U.S. Cl.
CPC ........ *H04W 36/0069* (2018.08); *H04W 36/0022* (2013.01); *H04W 36/08* (2013.01); *H04W 74/0833* (2013.01)

(58) Field of Classification Search
CPC ......... H04W 36/0069; H04W 36/08; H04W 36/28; H04W 36/0077; H04W 36/0022; H04W 36/0094; H04W 74/0833
See application file for complete search history.

(56) References Cited

U.S. PATENT DOCUMENTS 10,251,111 B2 * 4/2019 Wang ............... H04W 36/0016
2015/0215824 A1 7/2015 Nigam et al.
(Continued)

FOREIGN PATENT DOCUMENTS

| EP | 2978261 A1 | 1/2016 |
| EP | 3282754 A1 | 2/2018 |

(Continued)

OTHER PUBLICATIONS

Examination Report for Indian Application No. 202147011061 dated Feb. 3, 2022 and English translation.
(Continued)

*Primary Examiner* — Allahyar Kasraian
(74) *Attorney, Agent, or Firm* — Harness, Dickey & Pierce, P.L.C.

(57) ABSTRACT

The method includes determining a first type of a target network device for a first handover, the first type indicating whether a network device is a master network device or a secondary network device; transmitting a first message indicating the first type of the target network device for the first handover, so that the terminal device is disconnected with the first type of a source network device; and in response to the terminal device being connected with the first type of the target network device, a second message indicating that the first handover is completed, and the terminal device being connected with a second type of a target network device and disconnected with the second type of a source network device in a second handover, the second type being different from the first type and indicating whether a network device is a master network device or a secondary network device.

20 Claims, 8 Drawing Sheets

(56) References Cited

U.S. PATENT DOCUMENTS

| | | | | |
|---|---|---|---|---|
| 2015/0312811 A1* | 10/2015 | Lei | ........................ | H04W 36/38 |
| | | | | 370/331 |
| 2016/0227459 A1* | 8/2016 | Fujishiro | ........... | H04W 36/0079 |
| 2017/0181044 A1* | 6/2017 | Wen | ...................... | H04W 76/19 |
| 2018/0035339 A1* | 2/2018 | Mitsui | ................... | H04W 72/04 |
| 2020/0022035 A1* | 1/2020 | Kadiri | ................... | H04W 36/36 |
| 2020/0120576 A1* | 4/2020 | Luo | ........................ | H04W 16/20 |
| 2020/0187064 A1* | 6/2020 | Susitaival | .............. | H04W 36/08 |

FOREIGN PATENT DOCUMENTS

| | | |
|---|---|---|
| KR | 2017-0042305 A | 4/2017 |
| KR | 2017-0098826 A | 8/2017 |
| WO | WO-2015/108337 A1 | 7/2015 |
| WO | WO-2015118405 A2 | 8/2015 |
| WO | WO-2016087104 A1 | 6/2016 |

OTHER PUBLICATIONS

International Search Report PCT/ISA/210 for International Application No. PCT/CN2018/101584 dated Aug. 21, 2018.

Extended Search Report dated Mar. 4, 2022 for corresponding European patent application No. 18930735.8.

"3GPP; Technical Specification Group Radio Access Network; Evolved Universal Terrestrial Radio Access (E-UTRA) and NR; Multi-connectivity; Stage 2 (Release 15)," 3GPP Standard; vol. RAN WG2, No. V15.2.0, Jun. 20, 2018, XP051472914.

OPPO: "Discussion on 0ms handover interruption requirement for EN-DC", 3GPP Draft; R2-1802269, vol. RAN WG2, No. Athens, Greece; Feb. 14, 2018, XP051399166.

ERICSSON: "Draft CR to 37.340 to include inter-system MR DC HO", 3GPP Draft; R2-1812391—Draft, vol. RAN WG2, No. Gothenburg, Sweden; Aug. 9, 2018, XP051521993.

* cited by examiner

DUAL CONNECTIVITY HANDOVER

CROSS-REFERENCE TO RELATED APPLICATIONS

This application is a national phase under 35 U.S.C. § 371 of PCT International Application No. PCT/CN2018/101584 which has an International filing date of Aug. 21, 2018, the entire contents of each of which are hereby incorporated by reference.

TECHNICAL FIELD

Embodiments of the present disclosure generally relate to the field of telecommunication, and in particular, to methods, devices and computer readable storage media for dual connectivity handover.

BACKGROUND

In communication systems, such as Long Term Evolved (LTE) communication systems or the 5th generation wireless systems (5G), dual connectivity (DC) allows user equipments (UEs) to receive data simultaneously from different eNodeBs (eNBs) in order to boost the performance in a heterogeneous network.

Currently, in a dual connectivity handover procedure, the terminal device always breaks off both connection to a master base station (may be referred as to a source master network device) and the corresponding secondary base station (may be referred as to a source secondary network device), and starts Random Access Chanel (RACH) accessing to a further master base station (may be referred as to a target master network device) and a further secondary base station (may be referred as to a target secondary network device) simultaneously. Connection breaking off with both nodes brings data transmission interruption between the terminal device and the network device.

SUMMARY

In general, example embodiments of the present disclosure provide methods, devices and computer readable storage media for dual connectivity handover.

In a first aspect, there is provided method implemented at a network device. The method comprises in response to receiving a request for a dual connectivity handover procedure of a terminal device, determining a first type of a target network device for a first handover of the dual connectivity handover procedure, the first type indicating whether a network device is a master network device or a secondary network device; transmitting, to a source master network device, a first message indicating the first type of the target network device for the terminal device to be connected with in the first handover, so that the terminal device is disconnected with the first type of a source network device; and in response to the terminal device being connected with the first type of the target network device, transmitting, to the source master network device, a second message indicating that the first handover is completed, to enable a second handover of the dual connectivity handover procedure to be performed, the terminal device being connected with a second type of a target network device and disconnected with the second type of a source network device in the second handover, the second type being different from the first type and indicating whether a network device is a master network device or a secondary network device.

In a second aspect, there is provided method implemented at a network device. The method comprises transmitting a request for a dual connectivity handover procedure of a terminal device to a target master network device; in response to receiving, from the target master network device, a first message indicating a first type of a target network device for the terminal device to be connected with in a first handover of the dual connectivity handover procedure, transmitting, to the terminal device, an indication of the first type of the target network device, so that the terminal device is disconnected with the first type of a source network device for the terminal device to be connected with, the first type indicating whether a network device is a master network device or a secondary network device; and receiving, from the target master network device, a second message indicating that the first handover is completed, to enable a second handover of the dual connectivity handover procedure to be performed, the terminal device being connected with a second type of a target network device and disconnected with the second type of a source network device in the second handover, the second type being different from the first type and indicating whether a network device is a master network device or a secondary network device.

In a third aspect, there is provided method implemented at a terminal device. The method comprises receiving, from a source master network device, an indication of a first type of a target network device for the terminal device to be connected with in a first handover of the dual connectivity handover procedure, the first type indicating whether a network device is a master network device or a secondary network device; performing the first handover based on the indication of the first type of the target network device; and in response to the terminal device being connected with the first type of the target network device, performing a second handover of the dual connectivity handover procedure, the terminal device being connected with a second type of a target network device and disconnected with the second type of a source network device in the second handover, the second type being different from the first type and indicating whether a network device is a master network device or a secondary network device.

In a fourth aspect, there is provided method implemented at a network device. The method comprises in response to receiving an indication of a first type of a target network device for a terminal device to be connected with in a first handover of the dual connectivity handover procedure by the terminal device and the indication of the first type of the target network device being a target secondary network device, receiving a random access request from a terminal device; and transmitting an acknowledge for the random access request to the terminal device.

In a fifth aspect, there is provided method implemented at a network device. The method comprises receiving, from a source master network device, an indication of a first type of a target network device for the terminal device to be connected with in a first handover of the dual connectivity handover procedure, the first type indicating whether a network device is a master network device or a secondary network device.

In a sixth aspect, there is provided a network device. The device comprises at least one processor; and at least one memory including computer program codes. The at least one memory and the computer program codes are configured to, with the at least one processor, cause the device at least to perform the method according to the first aspect.

In a seventh aspect, there is provided a network device. The device comprises at least one processor; and at least one memory including computer program codes. The at least one memory and the computer program codes are configured to, with the at least one processor, cause the device at least to perform the method according to the second aspect.

In an eighth aspect, there is provided a terminal device. The device comprises at least one processor; and at least one memory including computer program codes. The at least one memory and the computer program codes are configured to, with the at least one processor, cause the device at least to perform the method according to the third aspect.

In a ninth aspect, there is provided a network device. The device comprises at least one processor; and at least one memory including computer program codes. The at least one memory and the computer program codes are configured to, with the at least one processor, cause the device at least to perform the method according to the fourth aspect.

In a tenth aspect, there is provided a network device. The device comprises at least one processor; and at least one memory including computer program codes. The at least one memory and the computer program codes are configured to, with the at least one processor, cause the device at least to perform the method according to the fifth aspect.

In an eleventh aspect, there is provided an apparatus comprising means to perform the steps of the method according to the first aspect.

In a twelfth aspect, there is provided an apparatus comprising means to perform the steps of the method according to the second aspect.

In a thirteenth aspect, there is provided an apparatus comprising means to perform the steps of the method according to the third aspect.

In a fourteenth aspect, there is provided an apparatus comprising means to perform the steps of the method according to the fourth aspect.

In a fifth aspect, there is provided an apparatus comprising means to perform the steps of the method according to the fifth aspect.

In a sixteenth aspect, there is provided a computer readable medium having a computer program stored thereon which, when executed by at least one processor of a device, causes the device to carry out the method according to the first aspect.

In an seventeenth aspect, there is provided a computer readable medium having a computer program stored thereon which, when executed by at least one processor of a device, causes the device to carry out the method according to the second aspect.

In an eighteenth aspect, there is provided a computer readable medium having a computer program stored thereon which, when executed by at least one processor of a device, causes the device to carry out the method according to the third aspect.

In a nineteenth aspect, there is provided a computer readable medium having a computer program stored thereon which, when executed by at least one processor of a device, causes the device to carry out the method according to the fourth aspect.

In a twentieth aspect, there is provided a computer readable medium having a computer program stored thereon which, when executed by at least one processor of a device, causes the device to carry out the method according to the fifth aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
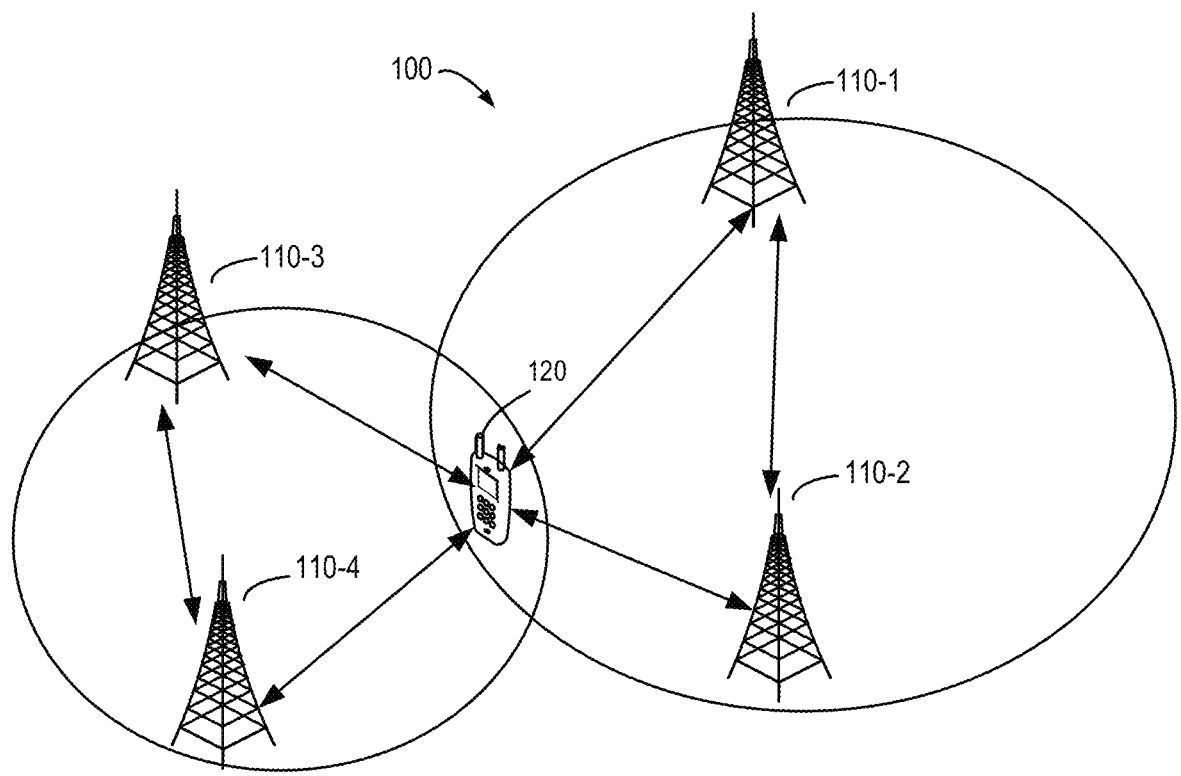
FIG. 1 shows an example communication system 100 in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB), a next generation NodeB (gNB), a Remote Radio Unit (RRU), a radio head (RH), a remote radio head (RRH), a low power node such as a femto node, a pico node, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

Now some example embodiments of the present disclosure are described below with reference to the figures. However, those skilled in the art would readily appreciate that the detailed description given herein with respect to these figures is for explanatory purpose as the present disclosure extends beyond theses limited example embodiments.

FIG. 1 shows an example communication system 100 in which example embodiments of the present disclosure can be implemented. In the communication system 100, which is a part of a communication network, includes network devices 110-1, 110-2, 110-3, 110-4, and a terminal device 120. It is to be understood that the communication system 100 may include any suitable number of terminal devices. It should be noted that the communication system 100 may also include other elements which are omitted for the purpose of clarity. The network devices 110-1, 110-2, 110-3, 110-4 may communicate with the terminal device 110. The network devices 110-1, 110-2, 110-3, 110-4 may communicate with each other. It is to be understood that the number of network devices and terminal devices shown in FIG. 1 is given for the purpose of illustration without suggesting any limitations. The communication system 100 may include any suitable number of network devices and terminal devices.

The communication system 100 may be regarded as an EN-DC network in 5G communication system. Due to the higher frequencies bands used and other reasons, it is deemed better to enable terminal devices to connect to LTE and 5G New Radio (NR) simultaneously. This is referred to as Multi-RAT Dual Connectivity (MR-DC). The LTE eNB may be referred to as the MNB to indicate that it is the 'Master' base station (i.e., Master Node, MN) controlling the 'Secondary' 5G NR base station (i.e., Secondary Node, SN). A MN 110-1 may select a suitable network device (for example, 110-2) as a SN in its courage 130. Similarly, a MN 110-3 may select a suitable network device (for example, 110-4) as SN in its courage 140. Only for the purpose of illustrations, the network devices 110-1 and 110-3 are referred to as MNs hereinafter and the network devices 110-2 and 110-4 are referred to as SNs hereinafter.

In the communication system 100, the terminal device 120 may perform a dual connectivity handover. That is, for example, the connection between the terminal device 120 and the MN 110-1 and its SN 110-2 may be switched to the connection between the terminal device 120 and the MN 110-3 and its SN 110-4. The handover procedure may be occurred when the location of terminal device 120 is changed, for example, the terminal device 120 may be moved from the courage 130 of the MN 110-1 to the courage 140 of the MN 110-3.

Depending on the communication technologies, the system 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Currently, in a MR-DC handover procedure, the terminal device 120 always breaks off both connection to a MN 110-1 (may be referred as to a source master network device) and a corresponding SN 110-2 (may be referred as to a source secondary network device), and starts Random Access Chanel (RACH) accessing to a further MN 110-3 (may be referred as to a target master network device) and a further SN 110-4 (may be referred as to a target secondary network device) simultaneously. Connection breaking off with both nodes brings data transmission interruption between the terminal device 120 and the network devices 110-1 and 110-2.

In MR-DC, Inter-Master Node Handover with/without Secondary Node change was defined in TS37.340 10.7. In RAN #78 (December 2017), Motivation for SI on mobility enhancements for New Radio (NR) was discussed in RP-172325. RAN WG2 has concluded that the Rel-8 LTE mobility procedure should be considered as the baseline mechanism also for NR. However, as a mobility procedure in any radio access technology, the NR handover cannot be executed instantaneously and thus some interruption time is also anticipated.

Example embodiments in accordance with the present disclosure provide a method for optimizing the DC handover procedure. During the handover procedure, the terminal device may keep one connection with a network device (either a MN or a SN) for data transmission. Therefore, there is no data interruption in the handover procedure. More details of the example embodiments of the present disclosure will be discussed with reference to FIGS. 2 to 8.

Principle and implementations of the present disclosure will be described in detail below with reference to FIGS. 2-5, which shows processes 200-500 according to example embodiments of the present disclosure. For the purpose of discussion, the processes 200-500 will be described with reference to FIG. 1. The processes 200-500 may involve a dual connectivity handover.

In DC implementation, the user traffic is split in Packet Data Convergence Protocol (PDCP). In DC, the data bearer which is split in PDCP is called split bearer. Specifically, there are multiple carriers in the master cell group (MCG) and multiple carriers in the secondary cell group (SCG). In the LTE DC, the data plane radio bearer may be independently served by the MN or the SN, or may be simultaneously served by the MN and the MN. When it is served by the MN only, it is called MCG bearer (MCG: MeNB controlled serving cell group). When it is served by the SN only, it is called SCG bearer (SCG: SeNB controlled serving cell group), and when it is served by MN and MN simultaneously, it is called split bearer.

In the MCG bearer, control plane signaling is usually always carried by the MN for transmission. In the SCG bearer mode, the same data bearer (uplink and downlink) is allocated to the MN or SN by the Serving Gateway (S-GW) control. The data stream is separately transmitted by the MN and the SN after the S-GW is divided. In the split bearer mode, the S1-U connection only exists between the MN and the S-GW, and all downlink data streams are first transmitted to the MN, and then the MN transmits some data by the X2 interface after being split according to a certain algorithm and ratio. Finally, data is transmitted to the terminal device simultaneously via the MN and the SN.

In the example embodiments in accordance with FIGS. 2-5, the network device 110-1 may be regarded as a network device connecting with the terminal device 120. The network device 110-1 involves a secondary network device 110-2, which is also connecting with the terminal device 120. Both network devices 110-1 and 110-2 are referred to as source network devices. The network devices 110-3 represents a master network device (MN) and the network device 110-4 represents a secondary network device (SN) associated with the master network device 110-3. The network devices 110-3 and 110-4 are network devices to which the terminal device 120 is to be connected and both of them are referred to as target network devices.

Figure 2:
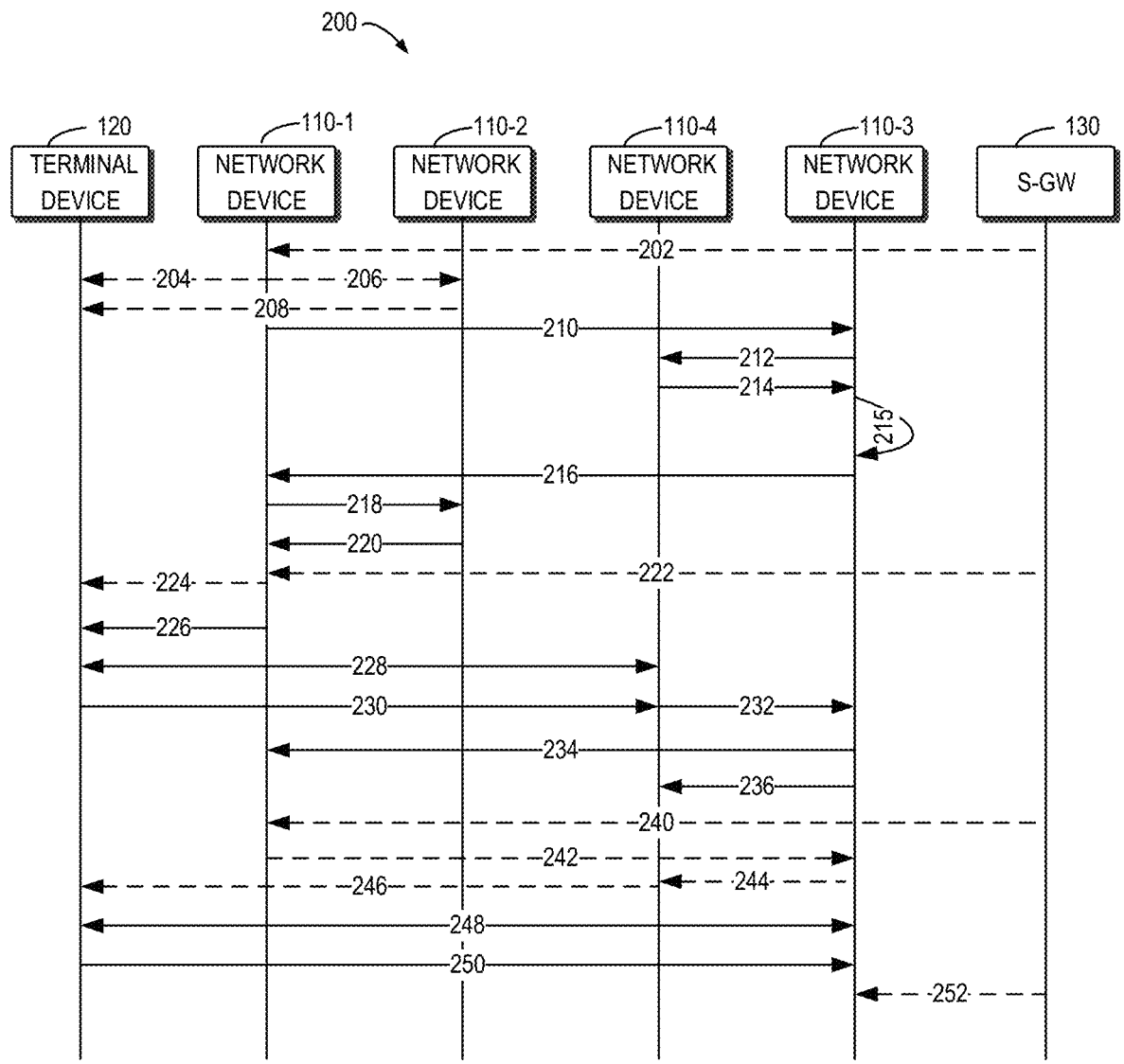
FIG. 2 shows a diagram of an example process 200 for a dual connectivity handover according to some example embodiments of the present disclosure.
Figure 3:
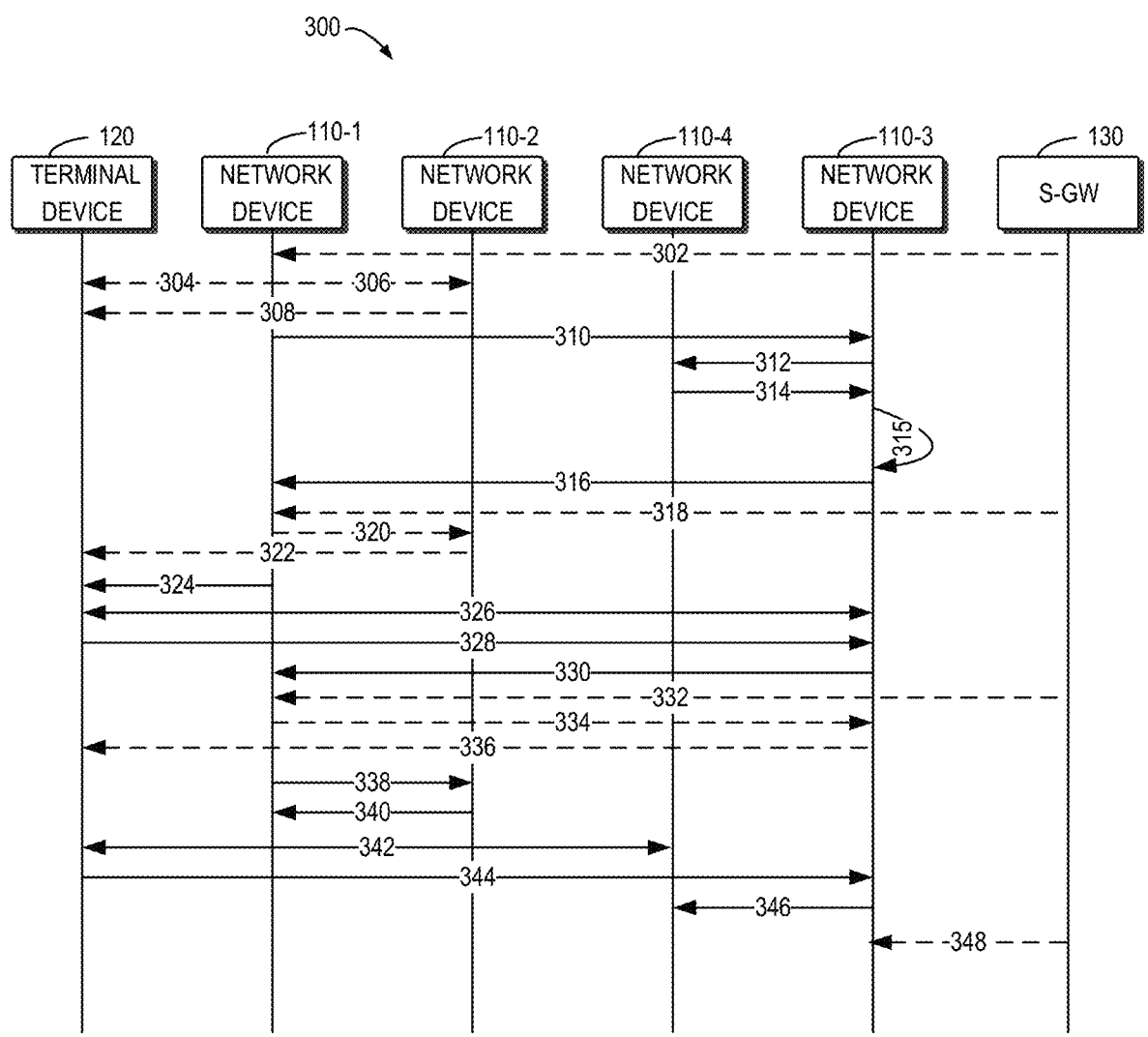
FIG. 3 shows a diagram of an example process 300 for a dual connectivity handover according to some example embodiments of the present disclosure.
Figure 4:
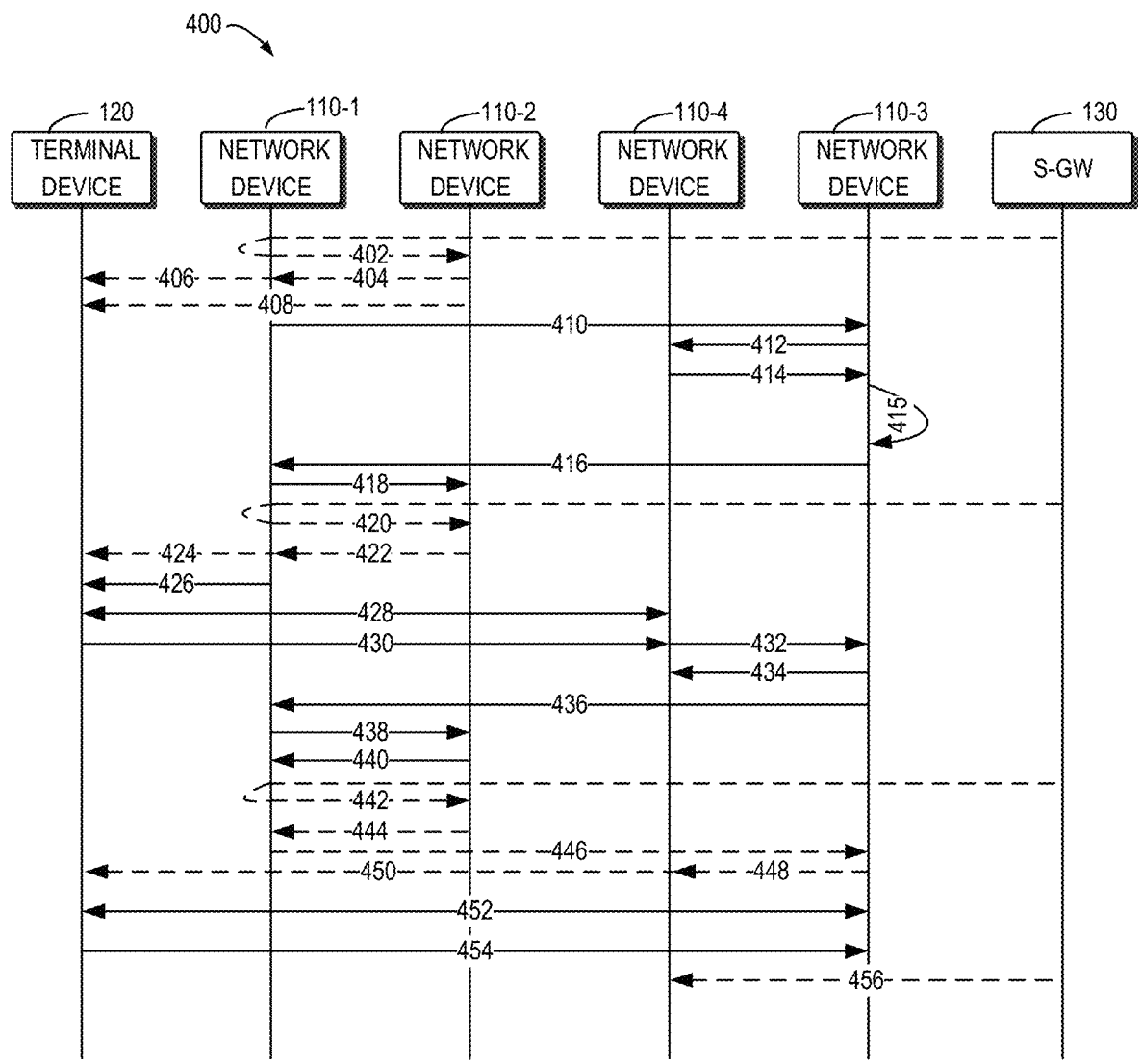
FIG. 4 shows a diagram of an example process 400 for a dual connectivity handover according to some example embodiments of the present disclosure.
Figure 5:
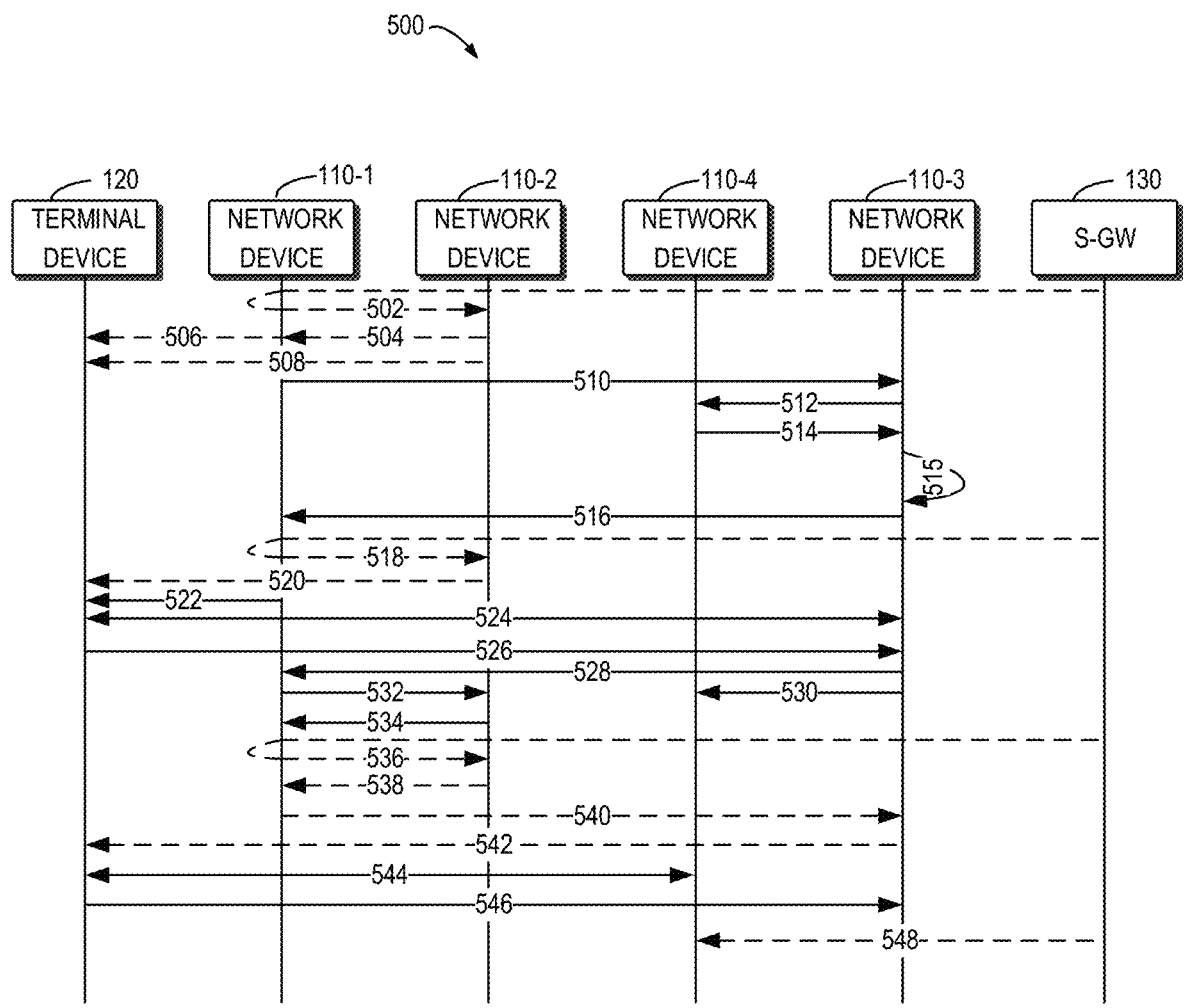
FIG. 5 shows a diagram of an example process 500 for a dual connectivity handover according to some example embodiments of the present disclosure.

The example embodiments illustrated in FIGS. 2-3 refer to the case of the split bearer with NR PDCP terminated in MN (i.e. MCG split bearer), while the example embodiments illustrated in FIGS. 4-5 refer to the case of split bearer with NR PDCP terminated in SN (i.e. SCG split bearer). In FIGS. 2-5, the data transmissions are represented in dotted lines and the control signaling are represented in solid lines.

FIG. 2 shows a diagram of an example process 200 for a dual connectivity handover in accordance with some example embodiments of the present disclosure.

As shown in FIG. 2, S-GW 130 transmits 202 the data stream to the network device 110-1. The data is split into two data branches. From the network device 110-1, one data branch is transmitted 204 to the network device 110-2 and the other data branch is transmitted 206 to the terminal device 120 simultaneously. The terminal device 110-2 also transmits 208 the data stream to the terminal device 120.

Once a handover procedure is triggered, the network device 110-1 transmits 210 a handover request for a dual connectivity handover procedure to the network device 110-3. The handover request indicates that a dual connectivity handover procedure of a terminal device to a target network device will be performed.

If the network device 110-3, referred as to a master network device, involves no corresponding secondary network device, the network device 110-3 transmits 212 a SgNB addition request to the network device 110-4 to add the network device 110-4 as a corresponding secondary network device. The network device 110-4 transmits 214, to the network device 110-3, an acknowledge for the SgNB addition request to confirm the addition procedure.

For the handover request transmitted from the network device 110-1, the network device 110-3 determines 215 a first type of a target network device for a first handover of the dual connectivity handover procedure and transmits 216, to the network device 110-1 a first message indicating the first type of the target network device for the terminal device 120 to be connected with in the first handover. As an example, the first type may indicate whether a network device is a master network device or a secondary network device. As another example, the first type may indicate whether a network device is a master network device or one of a plurality of secondary network devices.

In this case, the first type of the target network device may be a target secondary network device. Thus, the network device 110-1 transmits 218 a SgNB release request to the network device 110-2 to indicate that the network device 110-2 is to be disconnected with the terminal device 120. The network device 110-2 transmits 220, to the network device 110-1, an acknowledge for the SgNB release request to confirm the release procedure. As shown in FIG. 2, the data stream transmitted 222 from the S-GW 130 then may be transmitted 224 to the terminal device 120 via the connection between the network device 110-1 and the terminal device 120 only.

The network device 110-1 transmits 226, to the terminal device 120, a second message indicating the first type of the target network device. In this case that the first type of the target network device is a target secondary network device, the terminal device 120 may be informed that the connection of the terminal device 120 and the network device 110-2 is broken off. Correspondingly, the terminal device 120 may be informed that the connection between the terminal device 120 and a target secondary network device, i.e. the network device 110-4 as shown in FIG. 2, will be established.

Based on the second message, the first handover is to be performed by the terminal device 120. The terminal device 120 transmits 228 a first random request to the network device 110-4 to request an access to the network device 110-4. The first random request may be responded by the network device 110-4. After the RACH access is successful, the terminal device 120 transmits 230, to the network device 110-3, a first confirmation message indicating that the terminal device 120 confirms a success of a configuration of the network device 110-4 for the first handover. For example, the first confirmation message may be an uplink Signaling Radio Bearer (SRB) with packaged Radio Resource Control (RRC) message. The RRC message may be referred as to "RRCConnectionReconfigurationComplete2." The network device 110-4 may forward 232 the RRC message to the network device 110-3 and the network device 110-3 may generate a second message based on the first confirmation message to indicate that first handover is completed.

The network device 110-3 transmits 234 the second message to the network device 110-1, to indicate that the connection between the terminal device 120 and the network device 110-4 is established successfully and to enable a second handover of the dual connectivity handover procedure to be performed. The network device 110-3 may also transmit 236, to the network device 110-4, a third message to indicate that the SgNB reconfiguration is completed.

After the first handover, the data stream transmitted 240 from the S-GW may be forwarded 242 from the network device 110-1 to the network device 110-3. Then the data stream may be forwarded 244 to the network device 110-4 and transmitted 246 to the terminal device 120 from the network device 110-4.

After connected with the network device 110-4, i.e. a target secondary network device, the terminal device 120 performs a second handover of the dual connectivity handover procedure. The terminal device 120 transmits a second random request to a second type of the target device.

In this case, the terminal device 120 may transmit 248 the second random request to the network device 110-3, i.e. a target master the network device, to request an access to the network device 110-3. The second random request may be responded by the network device 110-3. After the RACH access is successful, the terminal device 120 transmits 250, to the network device 110-3, a second confirmation message indicating that the terminal device 120 confirms a success of a configuration of the network device 110-3 for the second handover. For example, the second confirmation message may be a RRC message. The RRC message may be referred as to "RRCConnectionReconfigurationComplete1."

As shown in FIG. 2, after the second handover, in the user plane, S-GW 130 transmits 252 the data stream to the network device 110-3. The data is split into two data branches. From the network device 110-3, one data branch is transmitted to the terminal device 120 and the other data branch is transmitted to the network device 110-4 simultaneously. The terminal device 110-4 then transmits the data stream to terminal device 120.

FIG. 3 shows a diagram of an example process 300 for a dual connectivity handover according to some example embodiments of the present disclosure. In the process 300 of FIG. 3, the actions 302-314 are substantially similar with the action 202-214 of the process 200 illustrated in FIG. 2. Therefore, the description for the actions 302-314 is omitted here.

For the handover request transmitted from the network device 110-1, the network device 110-3 determines 315 a first type of a target network device for a first handover of the dual connectivity handover procedure and transmits 316, to the network device 110-1 a first message indicating the first type of the target network device for the terminal device 120 to be connected with in the first handover. As an example, the first type may indicate whether a network device is a master network device or a secondary network device. As another example, the first type may indicate whether a network device is a master network device or one of a plurality of secondary network devices.

In this case, the first type of the target network device may be a target master network device, the terminal device 120 then may be disconnected with the network device 110-1. As shown in FIG. 3, the data stream transmitted 318 from the S-GW 130 may be forwarded 320 to the network device 110-2 and transmitted 322 to the terminal device 120 via the connection between the network device 110-2 and the terminal device 120 only.

The network device 110-1 transmits 324, to the terminal device 120, a second message indicating the first type of the target network device. In this case that the first type of the target network device is a target master network device, the terminal device 120 may be informed that the connection of the terminal device 120 and the network device 110-1 is broken off. Correspondingly, the terminal device 120 may be informed that the connection between the terminal device 120 and a target master network device, i.e. the network device 110-3 as shown in FIG. 3, will be established.

Based on the second message, the first handover is to be performed by the terminal device 120. The terminal device 120 transmits 326 a first random request to the network device 110-3 to request an access to the network device 110-3. The first random request may be responded by the network device 110-3. After the RACH access is successful, the terminal device 120 transmits 328, to the network device 110-3, a first confirmation message indicating that the terminal device 120 confirms a success of a configuration of the network device 110-3 for the first handover. For example, the first confirmation message may be an RRC message. The RRC message may be referred as to "RRCConnectionReconfigurationComplete1." The network device 110-3 may generate a second message based on the first confirmation message to indicate that first handover is completed.

The network device 110-3 transmits 330 the third message to the network device 110-1, to indicate that the connection between the terminal device 120 and the network device 110-3 is established successfully and to enable a second handover of the dual connectivity handover procedure to be performed.

After the first handover, the data stream transmitted 332 from the S-GW may be forwarded 334 from the network device 110-1 to the network device 110-3. Then the data stream may be transmitted 336 to the terminal device 120 from the network device 110-3.

When the second handover is to be performed, the network device 110-1 transmits 338 a SgNB release request to the network device 110-2 to indicate that the network device 110-2 is to be disconnected with the terminal device 120. The network device 110-2 transmits 340, to the network device 110-1, an acknowledge for the SgNB release request to confirm the release procedure.

After connected with the network device 110-3, i.e. a target master network device, the terminal device 120 performs a second handover of the dual connectivity handover procedure. The terminal device 120 transmits a second random request to a second type of the target device. In this case, the terminal device 120 may transmit 342 the second random request to the network device 110-4, i.e. a target secondary the network device, to request an access to the network device 110-4. The second random request may be responded by the network device 110-4.

After the RACH access is successful, the terminal device 120 transmits 344, to the network device 110-3, a second confirmation message indicating that the terminal device 120 confirms a success of a configuration of the network device 110-4 for the second handover. For example, the second confirmation message may be a RRC message. The RRC message may be referred as to "RRCConnectionReconfigurationComplete2." The network device 110-3 may also transmit 346, to the network device 110-4, a third message to indicate that the SgNB reconfiguration is completed.

As shown in FIG. 3, after the second handover, in the user plane, S-GW 130 transmits 348 the data stream to the network device 110-3. The data stream is split into two data branches. From the network device 110-3, one data branch is transmitted to the terminal device 120 and the other data branch is transmitted to the network device 110-4 simultaneously. The terminal device 110-4 then transmits the data stream to terminal device 120.

As described above, FIGS. 2-3 show example embodiments in accordance with present disclosure in a case of MCG split bearer. In this way, during the DC handover, the terminal device can keep one connection with a source network device for data transmission to avoid the data interrupt in the handover procedure. As another example, the optimization of handover may be also performed in a case of SCG split bearer. With reference to FIGS. 4-5, the example embodiments in accordance with present disclosure in a case of SCG split bearer will be described as below.

FIG. 4 shows a diagram of an example process 400 for a dual connectivity handover according to some example embodiments of the present disclosure.

As shown in FIG. 4, S-GW 130 transmits 402 the data stream to the network device 110-2 via the network device 110-1. The data is split into two data branches. From the network device 110-2, one data branch is transmitted 404 to the network device 110-1 and forwarded 406 to the terminal device 120, and the other data branch is transmitted 408 to the terminal device 120.

Once a handover procedure is triggered, the network device 110-1 transmits 410 a handover request for a dual connectivity handover procedure to the network device 110-3. The handover request indicates that a dual connectivity handover procedure of a terminal device to a target network device will be performed.

If the network device 110-3, referred as to a master network device, involves no corresponding secondary network device, the network device 110-3 transmits 412 a SgNB addition request to the network device 110-4 to add the network device 110-4 as a corresponding secondary network device. The network device 110-4 transmits 414, to the network device 110-3, an acknowledge for the SgNB addition request to confirm the addition procedure.

For the handover request transmitted from the network device 110-1, the network device 110-3 determines 415 a first type of a target network device for a first handover of the dual connectivity handover procedure and transmits 416, to the network device 110-1 a first message indicating the first type of the target network device for the terminal device 120 to be connected with in the first handover. As an example, the first type may indicate whether a network device is a master network device or a secondary network device. As another example, the first type may indicate whether a network device is a master network device or one of a plurality of secondary network devices.

In this case, the first type of the target network device may be a target secondary network device. Thus, the network device 110-1 transmits 418 a X2 message to the network device 110-2 to indicate that the network device 110-4 is to be connected with the terminal device and the network device 110-2 is to be disconnected with the terminal device 120.

As shown in FIG. 4, in the user plane, the data stream transmitted 420 from the S-GW 130 then may be transmitted 422 to the network device 110-1 from the network device 110-2 and forwarded 424 to the terminal device 120 via the connection between the network device 110-1 and the terminal device 120 only.

The network device 110-1 transmits 426, to the terminal device 120, a second message indicating the first type of the target network device. In the case that the first type of the target network device is a target secondary network device, the terminal device 120 may be informed that the connection of the terminal device 120 and the network device 110-2 is broken off. Correspondingly, the terminal device 120 may be informed that the connection between the terminal device 120 and a target secondary network device, i.e. the network device 110-4 as shown in FIG. 4, will be established.

Based on the second message, the first handover is to be performed by the terminal device 120. The terminal device 120 transmits 428 a first random request to the network device 110-4 to request an access to the network device 110-4. The first random request may be responded by the network device 110-4. After the RACH access is successful, the terminal device 120 transmits 430 to the network device 110-4, a first confirmation message indicating that the terminal device 120 confirms a success of a configuration of the network device 110-4 for the first handover. For example, the first confirmation message may be an uplink Signaling Radio Bearer (SRB) with packaged Radio Resource Control (RRC) message. The RRC message may be referred as to "RRCConnectionReconfigurationComplete2." The network device 110-4 may forward 432 the RRC message to the network device 110-3 and the network device 110-3 may generate a second message based on the first confirmation message to indicate that first handover is completed. The network device 110-3 may transmit 434, to the network device 110-4, a third message to indicate that the SgNB reconfiguration is completed.

The network device 110-3 transmits 436 the second message to the network device 110-1, to indicate that the connection between the terminal device 120 and the network device 110-4 is established successfully and NR PDCP has been new established in network device 110-4, to enable a second handover of the dual connectivity handover procedure to be performed. Thus, the network device 110-1 transmits 438 a SgNB release request to the network device 110-2 to indicate that the network device 110-2 is to be disconnected with the terminal device 120. The network device 110-2 transmits 440, to the network device 110-1, an acknowledge for the SgNB release request to confirm the release procedure.

After the first handover, the data stream transmitted 442 from the S-GW may be forwarded 444 from the network device 110-2 to the network device 110-1. Then the data stream may be forwarded 446 to the network device 110-3 and then forwarded 448 to the network device 110-4. The network device 110-4 may transmit 450 the data stream to the terminal device 120.

After connected with the network device 110-4, i.e. a target secondary network device, the terminal device 120 performs a second handover of the dual connectivity handover procedure. The terminal device 120 transmits a second random request to a second type of the target device. In this case, the terminal device 120 may transmit 452 the second random request to the network device 110-3, i.e. a target master the network device, to request an access to the network device 110-3. The second random request may be responded by the network device 110-3. After the RACH access is successful, the terminal device 120 transmits 454, to the network device 110-3, a second confirmation message indicating that the terminal device 120 confirms a success of a configuration of the network device 110-3 for the second handover. For example, the second confirmation message may be a RRC message. The RRC message may be referred as to "RRCConnectionReconfigurationComplete1."

As shown in FIG. 4, after the second handover, in the user plane, S-GW 130 transmits 456 the data stream to the network device 110-4. The data is split into two data branches. From the network device 110-4, one data branch is transmitted to the terminal device 120 and the other data branch is transmitted to the network device 110-3 simultaneously. The terminal device 110-3 then transmits the data stream to terminal device 120.

FIG. 5 shows a diagram of an example process 500 for a dual connectivity handover according to some example embodiments of the present disclosure.

In the process 500 of FIG. 5, the actions 502-414 are substantially similar with the action 402-414 of the process 400 illustrated in FIG. 4. Therefore, the description for the actions 502-414 is omitted here.

For the handover request transmitted from the network device 110-1, the network device 110-3 determines 515 a first type of a target network device for a first handover of the dual connectivity handover procedure and transmits 516, to the network device 110-1 a first message indicating the first type of the target network device for the terminal device 120 to be connected with in the first handover. As an example, the first type may indicate whether a network device is a master network device or a secondary network device. As another example, the first type may indicate whether a network device is a master network device or one of a plurality of secondary network devices.

In this case, the first type of the target network device may be a target master network device, the terminal device 120 then may be disconnected with the network device 110-1. As shown in FIG. 5, in the user plane, the data stream transmitted 518 from the S-GW 130 then may be transmitted 520 to the terminal device 120 from the network device 110-2 via the connection between the network device 110-2 and the terminal device 120 only.

The network device 110-1 transmits 522, to the terminal device 120, a second message indicating the first type of the target network device. In this case that the first type of the target network device is a target master network device, the terminal device 120 may be informed that the connection of the terminal device 120 and the network device 110-1 is broken off. Correspondingly, the terminal device 120 may be informed that the connection between the terminal device 120 and a target master network device, i.e. the network device 110-3 as shown in FIG. 3, will be established.

Based on the second message, the first handover is to be performed by the terminal device 120. The terminal device 120 transmits 524 a first random request to the network device 110-3 to request an access to the network device 110-3. The first random request may be responded by the network device 110-3. After the RACH access is successful, the terminal device 120 transmits 526, to the network device 110-3, a first confirmation message indicating that the terminal device 120 confirms a success of a configuration of the network device 110-3 for the first handover. For example, the first confirmation message may be an RRC message. The RRC message may be referred as to "RRCConnectionReconfigurationComplete1." The network device 110-3 may generate a second message based on the first confirmation message to indicate that first handover is completed.

The network device 110-3 transmits 528 the third message to the network device 110-1, to indicate that the connection between the terminal device 120 and the network device 110-3 is established successfully and NR PDCP has been new established in the network device 110-4, to enable a second handover of the dual connectivity handover procedure to be performed. The network device 110-3 may transmit 530, to the network device 110-4, a fourth message to indicate that the SgNB reconfiguration is completed.

When the second handover is to be performed, the network device 110-1 transmits 532 a SgNB release request to the network device 110-2 to indicate that the network device 110-2 is to be disconnected with the terminal device 120. The network device 110-2 transmits 534, to the network device 110-1, an acknowledge for the SgNB release request to confirm the release procedure.

After the first handover, the data stream transmitted 536 from the S-GW may be forwarded 538 from the network device 110-2 to the network device 110-1. The network device 110-1 may forward 540 the data stream to the network device 110-3 and then the data stream may be transmitted 542 to the terminal device 120 from the network device 110-3.

After connected with the network device 110-3, i.e. a target master network device, the terminal device 120 performs a second handover of the dual connectivity handover procedure. The terminal device 120 transmits a second random request to a second type of the target device. In this case, the terminal device 120 may transmit 544 the second random request to the network device 110-4, i.e. a target secondary the network device, to request an access to the network device 110-4. The second random request may be responded by the network device 110-4.

After the RACH access is successful, the terminal device 120 transmits 546, to the network device 110-3, a second confirmation message indicating that the terminal device 120 confirms a success of a configuration of the network device 110-4 for the second handover. For example, the second confirmation message may be a RRC message. The RRC message may be referred as to "RRCConnectionReconfigurationComplete2."

As shown in FIG. 5, after the second handover, in the user plane, S-GW 130 transmits 548 the data stream to the network device 110-4. The data is split into two data branches. From the network device 110-4, one data branch is transmitted to the terminal device 120 and the other data branch is transmitted to the network device 110-3 simultaneously. The terminal device 110-3 then transmits the data stream to terminal device 120.

According the example embodiments illustrated in FIGS. 2-5, the optimization for a DC handover could be implemented in both MCG split bearer and SCG split bearer. For both MCG split bearer and SCG split bearer, the DC handover may be performed without data interruption.

More details of the example embodiments in accordance with the present disclosure will be described with reference to FIGS. 6-8.

Figure 6:
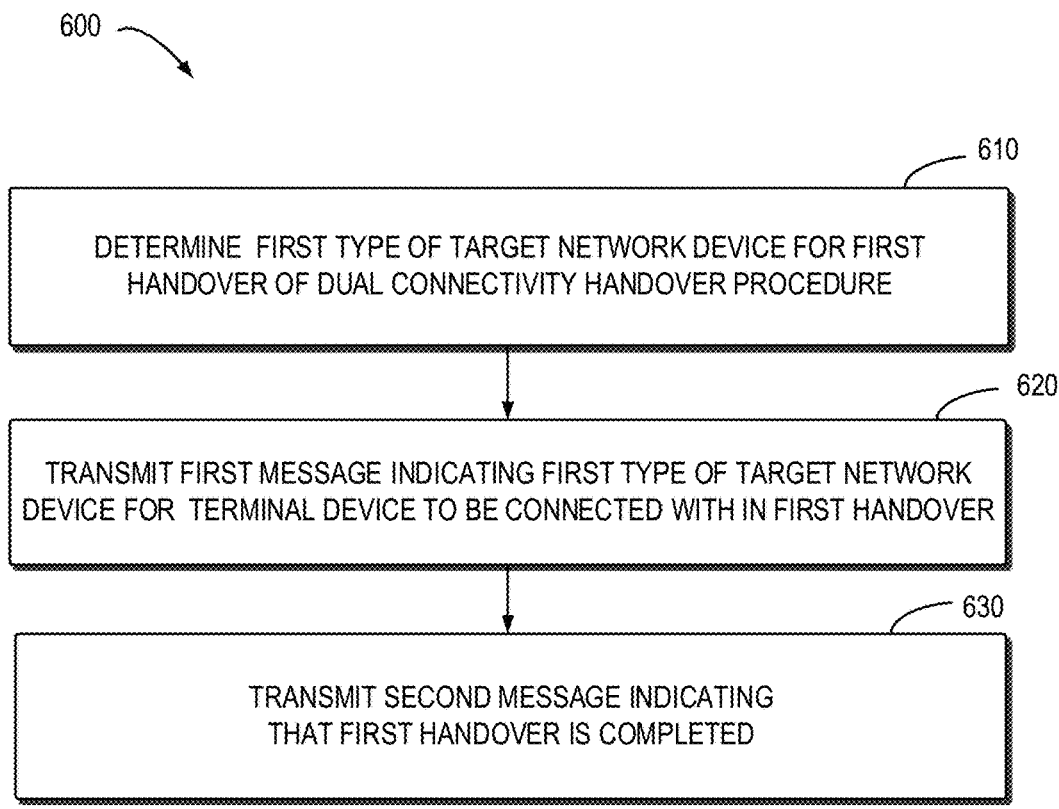
FIG. 6 shows a flowchart of an example method 600 for a dual connectivity handover according to some example embodiments of the present disclosure.

FIG. 6 shows a flowchart of an example method 600 for a dual connectivity handover according to some example embodiments of the present disclosure. The method 600 can be implemented at the network device 110-3 as shown in FIGS. 2-5. For the purpose of discussion, the method 600 will be described with reference to FIGS. 2-5.

At block 610, after receiving a request for a dual connectivity handover procedure of a terminal device, the network device 110-3 determines a first type of a target network device for a first handover of the dual connectivity handover procedure. The first type indicates whether a network device is a master network device or a secondary network device.

At block 620, the network device 110-3 transmits, to the source master network device (the network device 110-1 in FIGS. 2-5), a first message indicating the first type of the target network device for the terminal device to be connected with in the first handover, so that the terminal device 120 is disconnected with the first type of a source network device.

At block 630, if the terminal device 120 is connected with the first type of the target network device, the network device 110-3 transmits, to the source master network device, a second message indicating that the first handover is completed, to enable a second handover of the dual connectivity handover procedure to be performed. In the second handover, the terminal device 120 is connected with a second type of a target network device and disconnected with the second type of a source network device. The second type is different from the first type and indicates whether a network device is a master network device or a secondary network device.

In some example embodiments, the first type of the target network device is a target secondary network device. The network device 110-3 may receive, from the target secondary network device (the network device 110-4 in FIGS. 2-5), a first confirmation message indicating that the terminal device 120 confirms a success of a configuration of the target secondary network device for the first handover and generate the second message based on the first confirmation message to indicate that first handover is completed.

In some example embodiments, the method 600 may further comprise: if the network device 110-3 receives a random access request from the terminal device 120, the network device 110-3 may transmit an acknowledge for the random access request to the terminal device 120 and receive, from the terminal device 120, a second confirmation message indicating that the terminal device 120 confirms a success of a configuration of the target master network device (the network device 110-3 in FIGS. 2-5) for the second handover.

In some example embodiments, the first type of the target network device is a target secondary network device. If the network device 110-3 receives data transmitted from the source master network device, the network device 110-3 may forward the data to the target secondary network device, so that the data is transmitted to the terminal device from the target secondary network device.

In some example embodiments, the first type of the target network device is a target master network device. If the network device 110-3 receives a random access request from the terminal device 120, the network device 110-3 may transmit an acknowledge for the random access request to the terminal device 120 and receive, from the terminal device 120, a first confirmation message indicating that the terminal device 120 confirms a success of a configuration of the target master network device (the network device 110-3 in FIGS. 2-5) for the first handover and generate the second message based on the first confirmation message to indicate that first handover is completed.

In some example embodiments, the method 600 may further comprise: the network device 110-3 may receive, from the terminal device 120, a second confirmation message indicating that the terminal device 120 confirms a success of a configuration of a target source network device (the network device 110-4 in FIGS. 2-5) for the second handover.

In some example embodiments, the first type of the target network device is a target master network device. If the network device 110-3 receives data transmitted from the source master network device, the network device 110-3 may transmit the data to the terminal device and receive the data from the terminal device.

Figure 7:
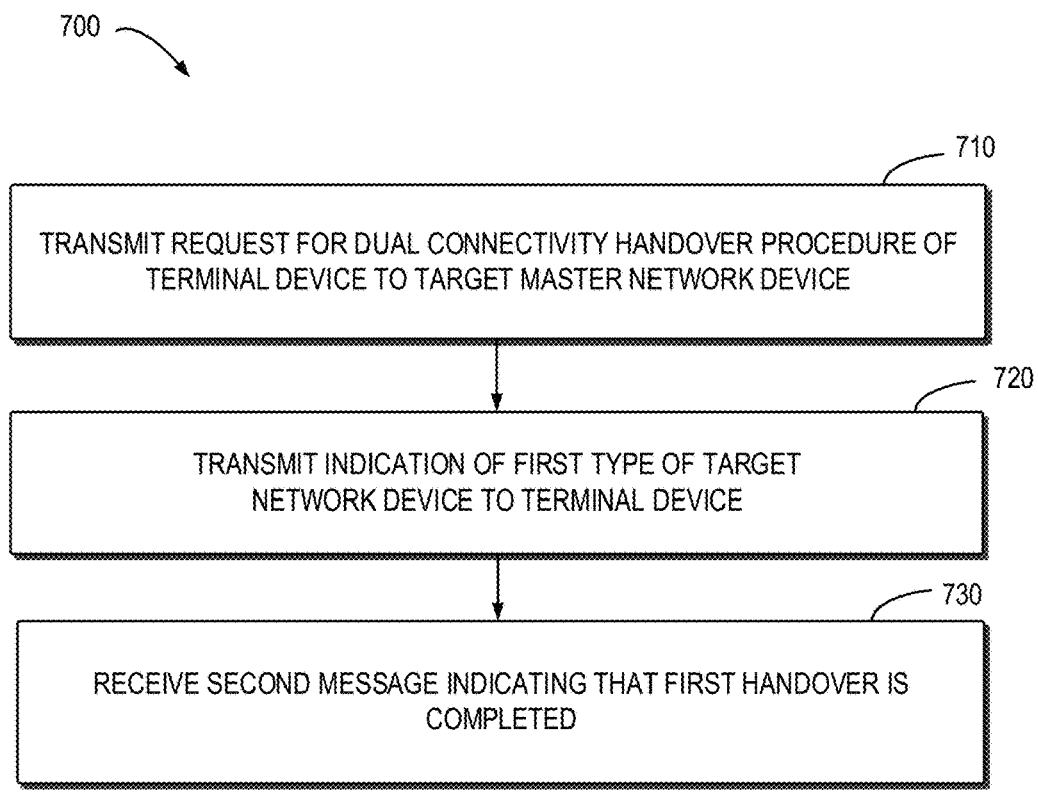
FIG. 7 shows a flowchart of an example method 700 for a dual connectivity handover according to some example embodiments of the present disclosure.

FIG. 7 shows a flowchart of an example method 700 for a dual connectivity handover according to some example embodiments of the present disclosure. The method 700 can be implemented at the network device 110-1 as shown in FIGS. 2-5. For the purpose of discussion, the method 700 will be described with reference to FIGS. 2-5.

At block 710, the network device 110-1 transmits a request for a dual connectivity handover procedure of a terminal device 120 to a target master network device (the network device 110-3 in FIGS. 2-5).

At block 720, if the network device 110-1 receives, from the target master network device, a first message indicating a first type of a target network device for the terminal device 120 to be connected with in a first handover of the dual connectivity handover procedure, the network device 110-1 transmits, to the terminal device 120, an indication of the first type of the target network device, so that the terminal device 120 is disconnected with the first type of a source network device for the terminal device to be connected with. The first type indicates whether a network device is a master network device or a secondary network device.

At block 730, the network device 110-1 receives, from the target master network device, a second message indicating that the first handover is completed, to enable a second handover of the dual connectivity handover procedure to be performed. In the second handover, the terminal device being connected with a second type of a target network device and disconnected with the second type of a source network device. The second type is different from the first type and indicating whether a network device is a master network device or a secondary network device.

In some example embodiments, the method 700 may further comprise if the network device 110-1 receives the first message, the network device 110-1 may transmit to, a secondary source network device (the network device 110-2 in FIGS. 2-5), a third message indicating the first type of the target network device for the terminal device 120 to be connected with in the first handover of the dual connectivity handover procedure.

In some example embodiments, the first type of the target network device is a target secondary network device. The method may further comprise if the network device 110-1 receives the first message, the network device 110-1 may receive transmitting data received from a gateway to terminal device and receive the data from the terminal device.

In some example embodiments, the first type of the target network device is a target master network device. The method may further comprise if the network device 110-1 receives the first message, the network device 110-1 may transmit data received from a gateway to a source secondary network device, so that the date is transmitted from the source secondary network device to the terminal device.

In some example embodiments, the first type of the target network device is a target secondary network device. The method may further comprise if the network device 110-1 receives the second message, the network device 110-1 may forward data received from a gateway to the target master network device, so that the data is transmitted to the target secondary network device, the data being transmitted from the target secondary network device to the terminal device.

In some example embodiments, the first type of the target network device is a target master network device. The method may further comprise if the network device 110-1 receives the second message, the network device 110-1 may forward data received from a gateway to the target master network device, so that the data is transmitted to the terminal device from the target master network device.

Figure 8:
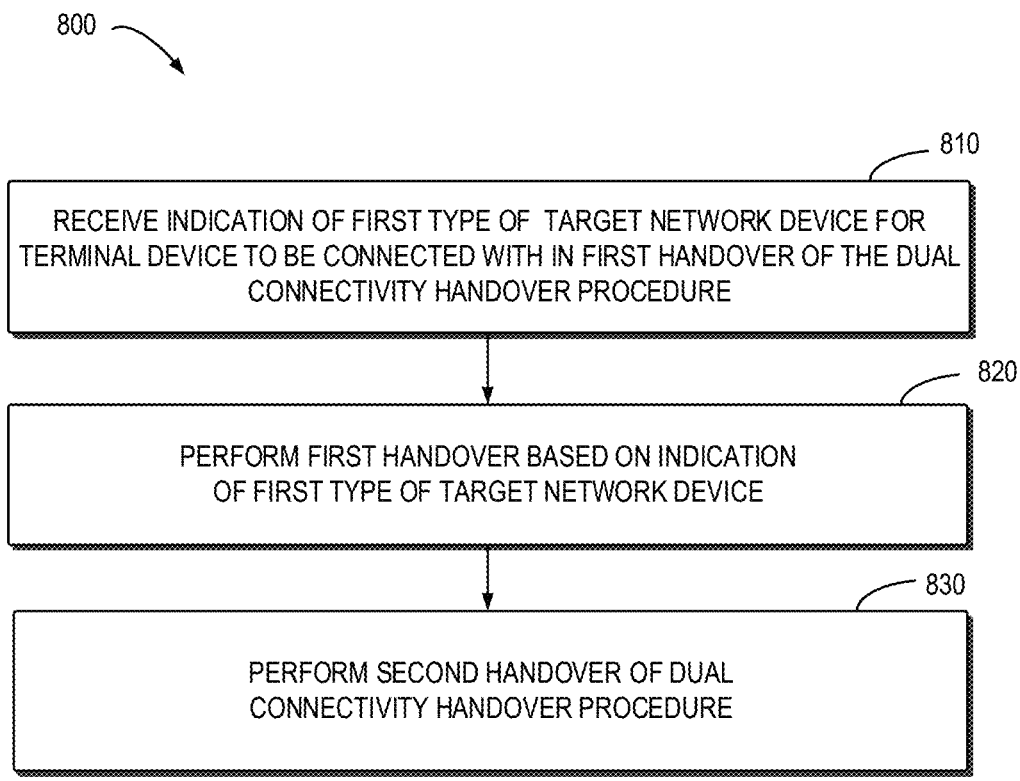
FIG. 8 shows a flowchart of an example method 800 for a dual connectivity handover according to some example embodiments of the present disclosure.

FIG. 8 shows a flowchart of an example method 800 for a dual connectivity handover according to some example embodiments of the present disclosure. The method 800 can be implemented at the terminal device 120 as shown in FIGS. 2-5. For the purpose of discussion, the method 800 will be described with reference to FIGS. 2-5.

At block 810, the terminal device 120 receives, from a source master network device (the network device 110-1 in FIGS. 2-5), an indication of a first type of a target network device for the terminal device 120 to be connected with in a first handover of the dual connectivity handover procedure. The first type indicating whether a network device is a master network device or a secondary network device.

At block 820, the terminal device 120 performs the first handover based on the indication.

At block 830, if the terminal device 120 is connected with the first type of the target network device, the terminal device 120 performs a second handover of the dual connectivity handover procedure. In the second handover, the terminal device is connected with a second type of a target network device and disconnected with the second type of a source network device. The second type is different from the first type and indicating whether a network device is a master network device or a secondary network device.

In some example embodiments, the first type of the target network device is a target secondary network device. The terminal device 120 may transmit a first random access request to the target secondary network device (the network device 110-4 in FIGS. 2-5). If receiving an acknowledge for the first random access request from the target secondary network device, the terminal device 120 may transmit, to the target secondary network device, a first confirmation message indicating that the terminal device 120 confirms a success of a configuration of the target secondary network device for the first handover.

In some example embodiments, the first type of the target network device is a target secondary network device. The terminal device 120 may transmit a second random access request to a target master network device (the network device 110-3 in FIGS. 2-5). If receiving an acknowledge for the second random access request from the target master network device, the terminal device 120 may transmit, to the target master network device, a second confirmation message indicating that the terminal device confirms a success of a configuration of the target master network device for the second handover.

In some example embodiments, the first type of the target network device is a target master network device. The terminal device 120 may transmit a first random access request to the target master network device (the network device 110-3 in FIGS. 2-5). If receiving an acknowledge for the first random access request from the target master network device, the terminal device 120 may transmit, to target master network device, a first confirmation message indicating that the terminal device 120 confirms a success of a configuration of target master network device for the first handover.

In some example embodiments, the first type of the target network device is a target master network device. The terminal device 120 may transmit a second random access request to a target secondary network device (the network device 110-4 in FIGS. 2-5). If receiving an acknowledge for the second random access request from the target secondary network device, the terminal device 120 may transmit, to the target master network device (the network device 110-3 in FIGS. 2-5), a second confirmation message indicating that the terminal device 120 confirms a success of a configuration of target secondary network device for the second handover.

In some example embodiments, the method 800 may further comprise if the terminal device 120 receives the indication of the first type of the target network device being a target secondary network device, the terminal device 120 receives data transmitted from the source master network device and transmits the data to the source master network device.

In some example embodiments, the method 800 may further comprise if the terminal device 120 receives the indication of the first type of the target network device being a target master network device, the terminal device 120 receives data from a source secondary network device and transmits the data to the source secondary network device.

In some example embodiments, the method 800 may further comprise if the terminal device 120 is connected with the first type of the target network device, the terminal device 120 receives data from the first type of the target network device and transmits data to the first type of the target network device.

Figure 9:
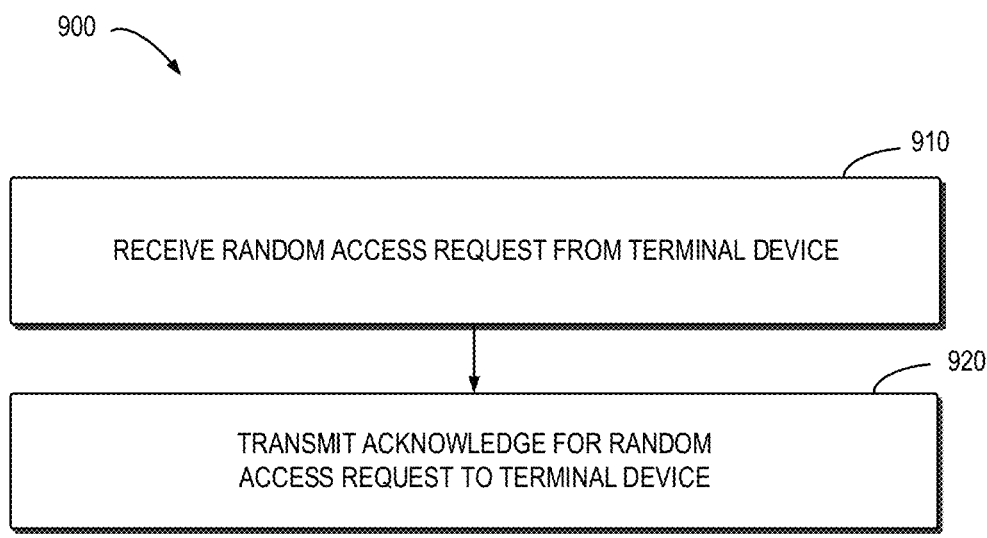
FIG. 9 a flowchart of an example method 900 for a dual connectivity handover according to some example embodiments of the present disclosure.

FIG. 9 a flowchart of an example method 900 for a dual connectivity handover according to some example embodiments of the present disclosure. The method 900 can be implemented at the network device 110-4 as shown in FIGS. 2-5. For the purpose of discussion, the method 900 will be described with reference to FIGS. 2-5.

At block 910, if the terminal device 120 receives an indication of a first type of a target network device for a terminal device to be connected with in a first handover of the dual connectivity handover procedure by the terminal device and the indication of the first type of the target network device is a target secondary network device, the network device 110-4 receives a random access request from a terminal device 120. At block 920, the network device 110-4 transmits an acknowledge for the random access request to the terminal device 120.

In some example embodiments, the method 900 may further comprise the network device 110-4 may receive, from the terminal device, a first confirmation message indicating that the terminal device confirms a success of a configuration of a target secondary network device for a first handover and transmit the first confirmation to a target master network device via forwarding by the target secondary network.

In some example embodiments, the method 900 may further comprise if the first handover is completed, the network device 110-4 may receive data forwarded from a source master network device; and transmit the data to the terminal device.

Figure 10:
FIG. 10 a flowchart of an example method 1000 for a dual connectivity handover according to some example embodiments of the present disclosure.

FIG. 10 a flowchart of an example method 1000 for a dual connectivity handover according to some example embodiments of the present disclosure. The method 1000 can be implemented at the network device 110-2 as shown in FIGS. 2-5. For the purpose of discussion, the method 1000 will be described with reference to FIGS. 2-5.

At block 1010, the network device 110-2 receives, from a source master network device, an indication of a first type of a target network device for the terminal device to be connected with in a first handover of the dual connectivity handover procedure, the first type indicating whether a network device is a master network device or a secondary network device.

In some example embodiments, the first type of the target network device is a target secondary network device. The method 1000 may further comprise if the network device 110-2 receives the indication of the first type of the target network device, the network device 110-2 may transmit data received from a gateway to a source master network device, so that the date is transmitted from the source master network device to the terminal device.

In some example embodiments, the first type of the target network device is a target master network device. The method 1000 may further comprise if the network device 110-2 receives the indication of the first type of the target network device, the network device 110-2 may transmit data received from a gateway to terminal device and receive data from the terminal device.

In some example embodiments, the method 1000 may further comprises if the first handover is completed, the network device 110-2 may transmit data received from a gateway to the source master network device, so that the data is transmitted to the first type of a target network device from the source master network device.

As described above, during the handover procedure, the terminal device may keep one connection with a network device (either a MN or a SN) for data transmission. Therefore, there is no data interruption in the handover procedure.

In some example embodiments, an apparatus capable of performing the method 600 (for example, the network device 110-3) may comprise means for performing the respective steps of the method 600. The means may be implemented in any suitable form. For example, the means may be implemented in a circuitry or software module.

In some example embodiments, the apparatus comprises: means for in response to receiving a request for a dual connectivity handover procedure of a terminal device, determining a first type of a target network device for a first handover of the dual connectivity handover procedure, the first type indicating whether a network device is a master network device or a secondary network device; means for transmitting, to a source master network device, a first message indicating the first type of the target network device for the terminal device to be connected with in the first handover, so that the terminal device is disconnected with the first type of a source network device; and means for in response to the terminal device being connected with the first type of the target network device, transmitting, to the source master network device, a second message indicating that the first handover is completed, to enable a second handover of the dual connectivity handover procedure to be performed, the terminal device being connected with a second type of a target network device and disconnected with the second type of a source network device in the second handover, the second type being different from the first type and indicating whether a network device is a master network device or a secondary network device.

In some example embodiments, the first type of the target network device is a target secondary network device. The means for transmitting comprises: means for receiving, from the target secondary network device, a first confirmation message indicating that the terminal device confirms a success of a configuration of the target secondary network device for the first handover; and means for generating the second message based on the first confirmation message to indicate that first handover is completed.

In some example embodiments, the apparatus further comprises: means for in response to receiving a random access request from the terminal device, transmitting an acknowledge for the random access request to the terminal device; and means for receiving, from the terminal device, a second confirmation message indicating that the terminal device confirms a success of a configuration of the target master network device for the second handover.

In some example embodiments, the first type of the target network device is a target secondary network device. The means for transmitting comprises: means for in response to receiving data transmitted from the source master network device, forwarding the data to the target secondary network device, so that the data is transmitted to the terminal device from the target secondary network device.

In some example embodiments, the first type of the target network device is a target master network device. The means for transmitting comprises: means for in response to receiving a random access request from the terminal device, transmitting an acknowledge for the random access request to the terminal device; means for receiving, from the terminal device, a first confirmation message indicating that the terminal device confirms a success of a configuration of the target master network device for the first handover; and means for generating the second message based on the first confirmation message to indicate that first handover is completed.

In some example embodiments, the apparatus further comprises: means for receiving, from the terminal device, a second confirmation message indicating that the terminal device confirms a success of a configuration of a target source network device for the second handover.

In some example embodiments, the first type of the target network device is a target master network device. The means for transmitting comprises: means for in response to receiving data transmitted from the source master network device, transmitting the data to the terminal device.

In some example embodiments, an apparatus capable of performing the method 700 (for example, the network device 110-1) may comprise means for performing the respective steps of the method 700. The means may be implemented in any suitable form. For example, the means may be implemented in a circuitry or software module.

In some example embodiments, the apparatus comprises: means for transmitting a request for a dual connectivity handover procedure of a terminal device to a target master network device; means for in response to receiving, from the target master network device, a first message indicating a first type of a target network device for the terminal device to be connected with in a first handover of the dual connectivity handover procedure, transmitting, to the terminal device, an indication of the first type of the target network device, so that the terminal device is disconnected with the first type of a source network device for the terminal device to be connected with, the first type indicating whether a network device is a master network device or a secondary network device; and means for receiving, from the target master network device, a second message indicating that the first handover is completed, to enable a second handover of the dual connectivity handover procedure to be performed, the terminal device being connected with a second type of a target network device and disconnected with the second type of a source network device in the second handover, the second type being different from the first type and indicating whether a network device is a master network device or a secondary network device.

In some example embodiments, the apparatus further comprises: means for in response to receiving the first message, transmitting, to a secondary source network device, a third message indicating the first type of the target network device for the terminal device to be connected with in the first handover of the dual connectivity handover procedure.

In some example embodiments, the first type of the target network device is a target secondary network device. The apparatus further comprises: means for in response to receiving the first message, transmitting data received from a gateway to terminal device and receiving data from terminal device.

In some example embodiments, the first type of the target network device is a target master network device. The apparatus further comprises: means for in response to receiving the first message, transmitting data received from a gateway to a source secondary network device, so that the date is transmitted from the source secondary network device to the terminal device.

In some example embodiments, the first type of the target network device is a target secondary network device. The apparatus further comprises: means for in response to receiving the second message, forwarding data received from a gateway to the target master network device, so that the data is transmitted to the target secondary network device, the data being transmitted from the target secondary network device to the terminal device.

In some example embodiments, the first type of the target network device is a target master network device. The apparatus further comprises: means for in response to receiving the second message, forwarding data received from a gateway to the target master network device, so that the data is transmitted to the terminal device from the target master network device.

In some example embodiments, an apparatus capable of performing the method 800 (for example, the terminal device 120) may comprise means for performing the respective steps of the method 800. The means may be implemented in any suitable form. For example, the means may be implemented in a circuitry or software module.

In some example embodiments, the apparatus comprises: means for receiving, from a source master network device, an indication of a first type of a target network device to be connected with in a first handover of the dual connectivity handover procedure, the first type indicating whether a network device is a master network device or a secondary network device; means for performing the first handover based on the indication of a first type of a target network device; and means for in response to the terminal device being connected with the first type of the target network device, performing a second handover of the dual connectivity handover procedure, the terminal device being connected with a second type of a target network device and disconnected with the second type of a source network device in the second handover, the second type being different from the first type and indicating whether a network device is a master network device or a secondary network device.

In some example embodiments, the first type of the target network device is a target secondary network device. The means for performing comprises: means for transmitting a first random access request to the target secondary network device; and means for in response to receiving an acknowledge for the first random access request from the target secondary network device, transmitting, to the target secondary network device, a first confirmation message indicating that the terminal device confirms a success of a configuration of the target secondary network device for the first handover.

In some example embodiments, the first type of the target network device is a target secondary network device. The means for performing comprises: means for transmitting a second random access request to a target master network device; and means for in response to receiving an acknowledge for the second random access request from the target master network device, transmitting, to the target master network device, a second confirmation message indicating that the terminal device confirms a success of a configuration of the target master network device for the second handover.

In some example embodiments, the first type of the target network device is a target master network device. The means for performing comprises: means for transmitting a first random access request to the target master network device; and means for in response to receiving an acknowledge for the first random access request from the target master network device, transmitting, to target master network device, a first confirmation message indicating that the terminal device confirms a success of a configuration of target master network device for the first handover.

In some example embodiments, the first type of the target network device is a target master network device. The means for performing comprises: means for transmitting a second random access request to a target secondary network device; and means for in response to receiving an acknowledge for the second random access request from the target secondary network device, transmitting, to the target master network device, a second confirmation message indicating that the terminal device confirms a success of a configuration of target secondary network device for the second handover.

In some example embodiments, the apparatus further comprises: means for in response to receiving the indication of a first type of a target network device being a target secondary network device, receiving data transmitted from the source master network device and sending data to the source master network device.

In some example embodiments, the apparatus further comprises: means for in response to receiving the indication of a first type of a target network device being a target master network device, receiving data from a source secondary network device and sending data to the source secondary network device.

In some example embodiments, the apparatus further comprises: means for in response to being connected with the first type of the target network device, receiving data from the first type of the target network device and sending data to the first type of the target network device.

In some example embodiments, an apparatus capable of performing the method 900 (for example, the terminal device 110-4) may comprise means for performing the respective steps of the method 900. The means may be implemented in any suitable form. For example, the means may be implemented in a circuitry or software module.

In some example embodiments, the apparatus comprises: means for in response to receiving an indication of a first type of a target network device for a terminal device to be connected with in a first handover of the dual connectivity handover procedure by the terminal device and the indication of the first type of the target network device being a target secondary network device, receiving a random access request from a terminal device; and means for transmitting an acknowledge for the random access request to the terminal device.

In some example embodiments, the apparatus further comprises: means for receiving, from the terminal device, a first confirmation message indicating that the terminal device confirms a success of a configuration of a target secondary network device for a first handover; and means for transmitting the first confirmation to a target master network device.

In some example embodiments, the apparatus further comprises: means for in response to the first handover is completed, receiving data forwarded from a source master network device; and means for transmitting the data to the terminal device.

In some example embodiments, an apparatus capable of performing the method 1000 (for example, the terminal device 110-2) may comprise means for performing the respective steps of the method 1000. The means may be implemented in any suitable form. For example, the means may be implemented in a circuitry or software module.

In some example embodiments, the apparatus comprises means for receiving, from a source master network device, an indication of a first type of a target network device for the terminal device to be connected with in a first handover of the dual connectivity handover procedure, the first type indicating whether a network device is a master network device or a secondary network device.

In some example embodiments, the first type of the target network device is a target secondary network device. The apparatus further comprises: means for in response to receiving the indication of the first type of the target network device, transmitting data received from a gateway to a source master network device, so that the date is transmitted from the source master network device to the terminal device.

In some example embodiments, the first type of the target network device is a target secondary network device. The apparatus further comprises: means for in response to receiving the indication of the first type of the target network device, transmitting data received from a gateway to terminal device.

In some example embodiments, the apparatus further comprises means for in response to the first handover is completed, transmitting data received from a gateway to the source master network device, so that the data is transmitted to the first type of a target network device from the source master network device.

Figure 11:
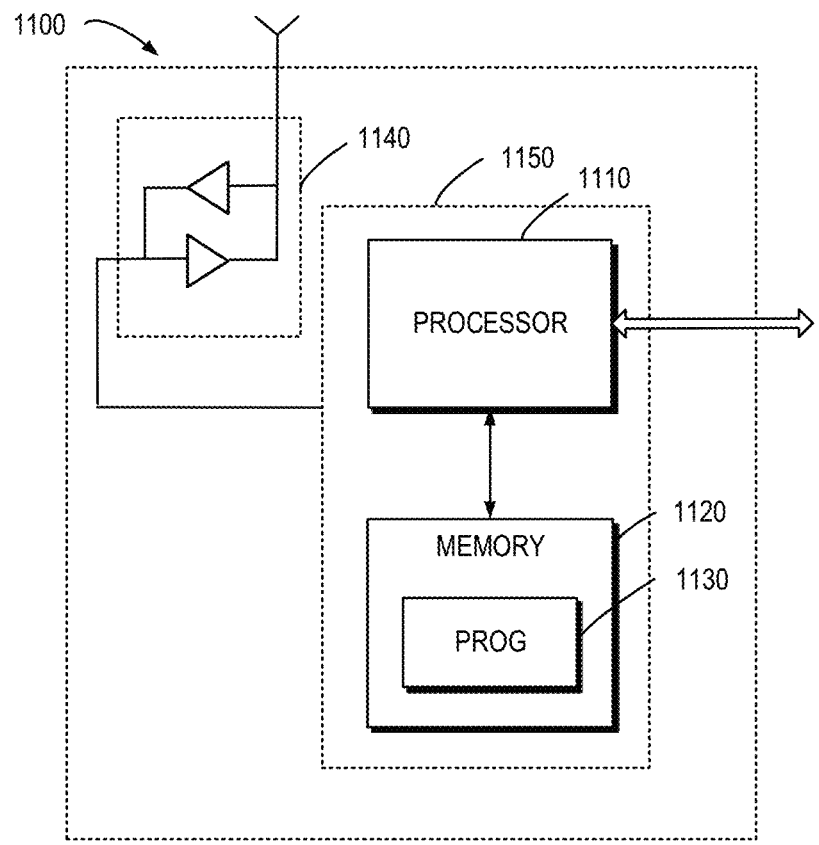
FIG. 11 is a simplified block diagram of a device that is suitable for implementing example embodiments of the present disclosure.

FIG. 11 is a simplified block diagram of a device 1100 that is suitable for implementing example embodiments of the present disclosure. The device 1100 can be considered as a further example implementation of a terminal device 120 as shown in FIG. 1. Accordingly, the device 1100 can be implemented at or as at least a part of the terminal device 110.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the example embodiments of the present disclosure, as discussed herein with reference to FIGS. 2 to 8. The example embodiments herein may be implemented by computer software executable by the processor 1110 of the device 1100, or by hardware, or by a combination of software and hardware. The processor 1110 may be configured to implement various example embodiments of the present disclosure. Furthermore, a combination of the processor 1110 and memory 1110 may form processing means 1150 adapted to implement various example embodiments of the present disclosure.

The memory 1110 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 11 Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a network device, comprising:
    in response to receiving a request for a dual connectivity handover procedure of a terminal device, determining a first type of a target network device for a first handover of the dual connectivity handover procedure, the first type indicating whether a network device is a master network device or a secondary network device;
    transmitting, to a source master network device, a first message indicating the first type of the target network device for the terminal device to be connected with in the first handover, so that the terminal device is disconnected from the first type of a source network device; and
    in response to the terminal device being connected with the first type of the target network device, transmitting, to the source master network device, a second message indicating that the first handover is completed, to enable a second handover of the dual connectivity handover procedure to be performed, the terminal device being connected with a second type of a target network device and disconnected from the second type of a source network device in the second handover, the second type being different from the first type and indicating whether a network device is a master network device or a secondary network device.

2. The method of claim 1, wherein the first type of the target network device is a target secondary network device, and transmitting the second message comprises:
    receiving, from the target secondary network device, a first confirmation message indicating that the terminal device confirms a success of a configuration of the target secondary network device for the first handover; and
    generating the second message based on the first confirmation message to indicate that first handover is completed.

3. The method of claim 2, further comprising:
    in response to receiving a random access request from the terminal device, transmitting an acknowledge for the random access request to the terminal device; and
    receiving, from the terminal device, a second confirmation message indicating that the terminal device confirms a success of a configuration of the target master network device for the second handover.

4. The method of claim 1, wherein the first type of the target network device is a target secondary network device, and transmitting the second message comprises:
    in response to receiving data transmitted from the source master network device, forwarding the data to the target secondary network device, so that the data is transmitted to the terminal device from the target secondary network device.

5. The method of claim 1, wherein the first type of the target network device is a target master network device, and transmitting the second message comprises:
    in response to receiving a random access request from the terminal device, transmitting an acknowledge for the random access request to the terminal device;
    receiving, from the terminal device, a first confirmation message indicating that the terminal device confirms a success of a configuration of the target master network device for the first handover; and generating the second message based on the first confirmation message to indicate that first handover is completed.

6. The method of claim 5, further comprising:
receiving, from the terminal device, a second confirmation message indicating that the terminal device confirms a success of a configuration of a target secondary network device for the second handover.

7. The method of claim 1, wherein the first type of the target network device is a target master network device, and transmitting the second message comprises:
in response to receiving data transmitted from the source master network device, transmitting the data to the terminal device; and
receiving the data from the terminal device.

8. A method implemented at a network device, comprising:
transmitting a request for a dual connectivity handover procedure of a terminal device to a target master network device; and
in response to receiving, from the target master network device, a first message indicating a first type of a target network device for the terminal device to be connected with in a first handover of the dual connectivity handover procedure, transmitting, an indication of the first type of the target network device to the terminal device, so that the terminal device is disconnected from the first type of a source network device for the terminal device to be connected with, the first type indicating whether a network device is a master network device or a secondary network device; and
receiving, from the target master network device, a second message indicating that the first handover is completed, to enable a second handover of the dual connectivity handover procedure to be performed, the terminal device being connected with a second type of a target network device and disconnected from the second type of a source network device in the second handover, the second type being different from the first type and indicating whether a network device is a master network device or a secondary network device.

9. The method of claim 8, further comprising:
in response to receiving the first message, transmitting, to a secondary source network device, a third message indicating the first type of the target network device for the terminal device to be connected with in the first handover of the dual connectivity handover procedure.

10. The method of claim 8, wherein the first type of the target network device is a target secondary network device, and the method further comprising:
in response to receiving the first message, transmitting data received from a gateway to terminal device; and
receiving the data from the terminal device.

11. The method of claim 8, wherein the first type of the target network device is a target master network device, and the method further comprising:
in response to receiving the first message, transmitting data received from a gateway to a source secondary network device, so that the data is transmitted from the source secondary network device to the terminal device.

12. The method of claim 8, wherein the first type of the target network device is a target secondary network device, and the method further comprising:
in response to receiving the second message, forwarding data received from a gateway to the target master network device, so that the data is transmitted to the target secondary network device, the data being transmitted from the target secondary network device to the terminal device.

13. The method of claim 8, wherein the first type of the target network device is a target master network device, and the method further comprising:
in response to receiving the second message, forwarding data received from a gateway to the target master network device, so that the data is transmitted to the terminal device from the target master network device.

14. A method implemented at a terminal device, comprising:
receiving, from a source master network device, an indication of a first type of a target network device for the terminal device to be connected with in a first handover of the dual connectivity handover procedure, the first type indicating whether a network device is a master network device or secondary network device;
performing the first handover based on the indication of the first type of the target network device; and
in response to being connected with the first type of the target network device, performing a second handover of the dual connectivity handover procedure, the terminal device being connected with a second type of a target network device and disconnected from the second type of a source network device in the second handover, the second type being different from the first type and indicating whether a network device is a master network device or secondary network device.

15. The method of claim 14, wherein the first type of the target network device is a target secondary network device, and performing the first handover comprises:
transmitting a first random access request to the target secondary network device; and
in response to receiving an acknowledge for the first random access request from the target secondary network device, transmitting, to the target secondary network device, a first confirmation message indicating that the terminal device confirms a success of a configuration of the target secondary network device for the first handover.

16. The method of claim 14, wherein the first type of the target network device is a target secondary network device, and performing the second handover comprises:
transmitting a second random access request to a target master network device; and
in response to receiving an acknowledge for the second random access request from the target master network device, transmitting, to the target master network device, a second confirmation message indicating that the terminal device confirms a success of a configuration of the target master network device for the second handover.

17. The method of claim 14, wherein the first type of the target network device is a target master network device, and performing the first handover comprises:
transmitting a first random access request to the target master network device; and
in response to receiving an acknowledge for the first random access request from the target master network device, transmitting, to target master network device, a first confirmation message indicating that the terminal device confirms a success of a configuration of target master network device for the first handover.

18. The method of claim 14, wherein the first type of the target network device is a target master network device, and performing the second handover comprises:

transmitting a second random access request to a target secondary network device; and in response to receiving an acknowledge for the second random access request from the target secondary network device, transmitting, to the target master network device, a second confirmation message indicating that the terminal device confirms a success of a configuration of target secondary network device for the second handover.

19. The method of claim 14, further comprising:

in response to receiving the indication of the first type of the target network device being a target secondary network device, receiving data transmitted from the source master network device; and transmitting the data to the source master network device.

20. The method of claim 14, further comprising:

in response to receiving indication of the first type of the target network device being a target master network device, receiving data from a source secondary network device; and transmitting the data to the source secondary network device.

\* \* \* \* \*